Jan. 18, 1938.  C. A. BICKEL  2,105,962
DIAMETER GAUGING APPARATUS
Filed May 28, 1935  4 Sheets-Sheet 3
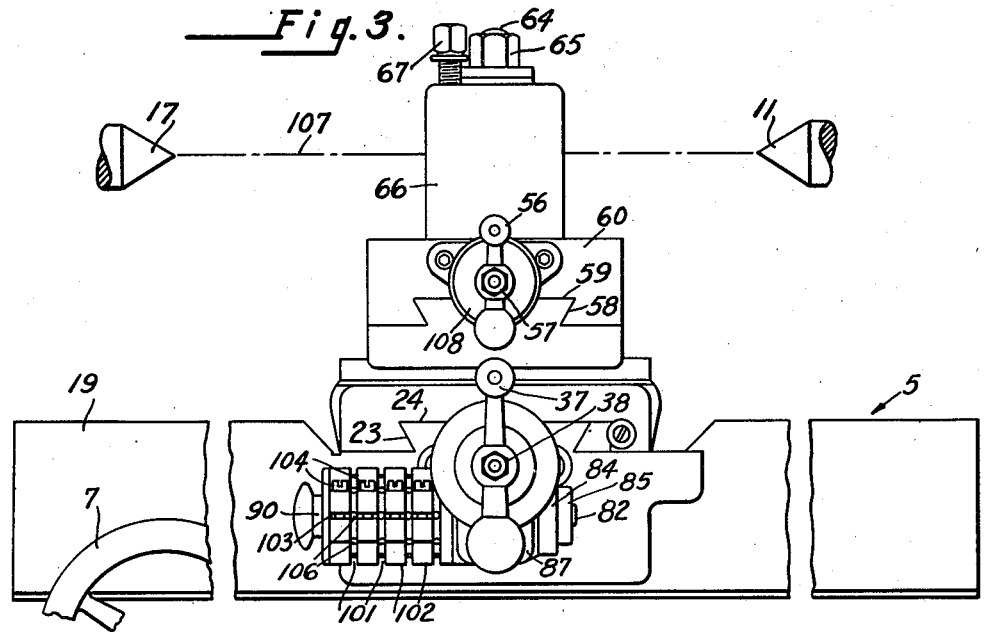
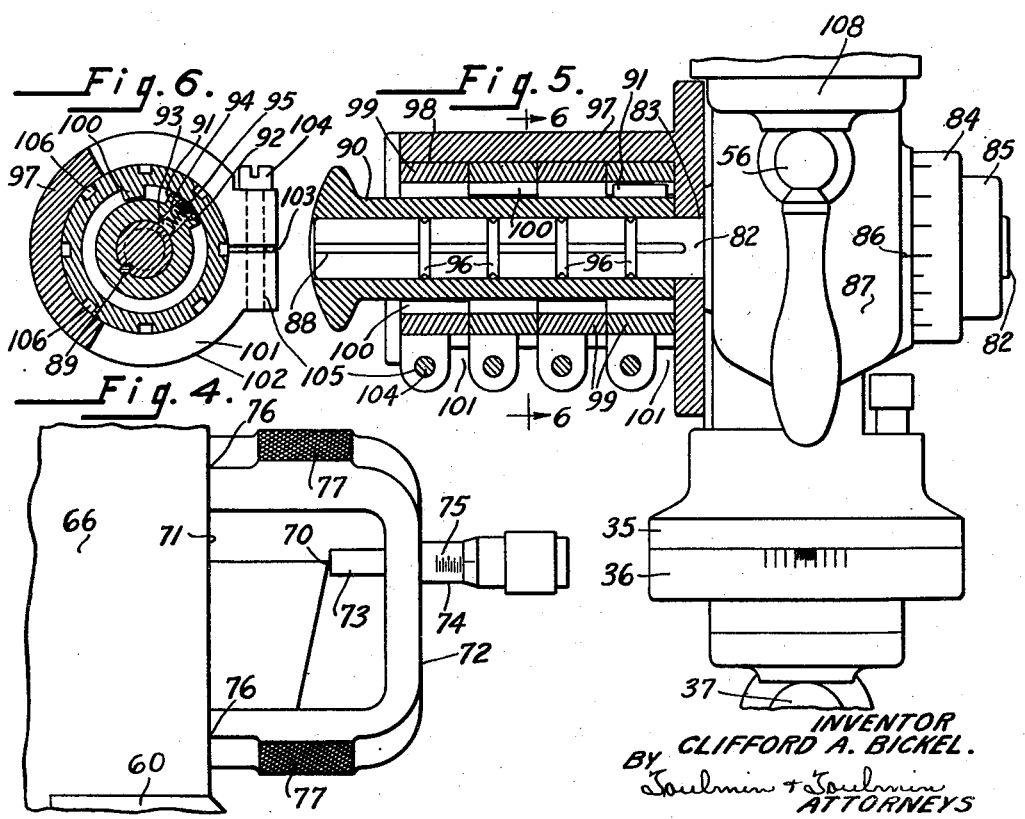
INVENTOR
CLIFFORD A. BICKEL.
BY Toulmin + Toulmin
ATTORNEYS Jan. 18, 1938.  C. A. BICKEL  2,105,962
DIAMETER GAUGING APPARATUS
Filed May 28, 1935   4 Sheets-Sheet 4

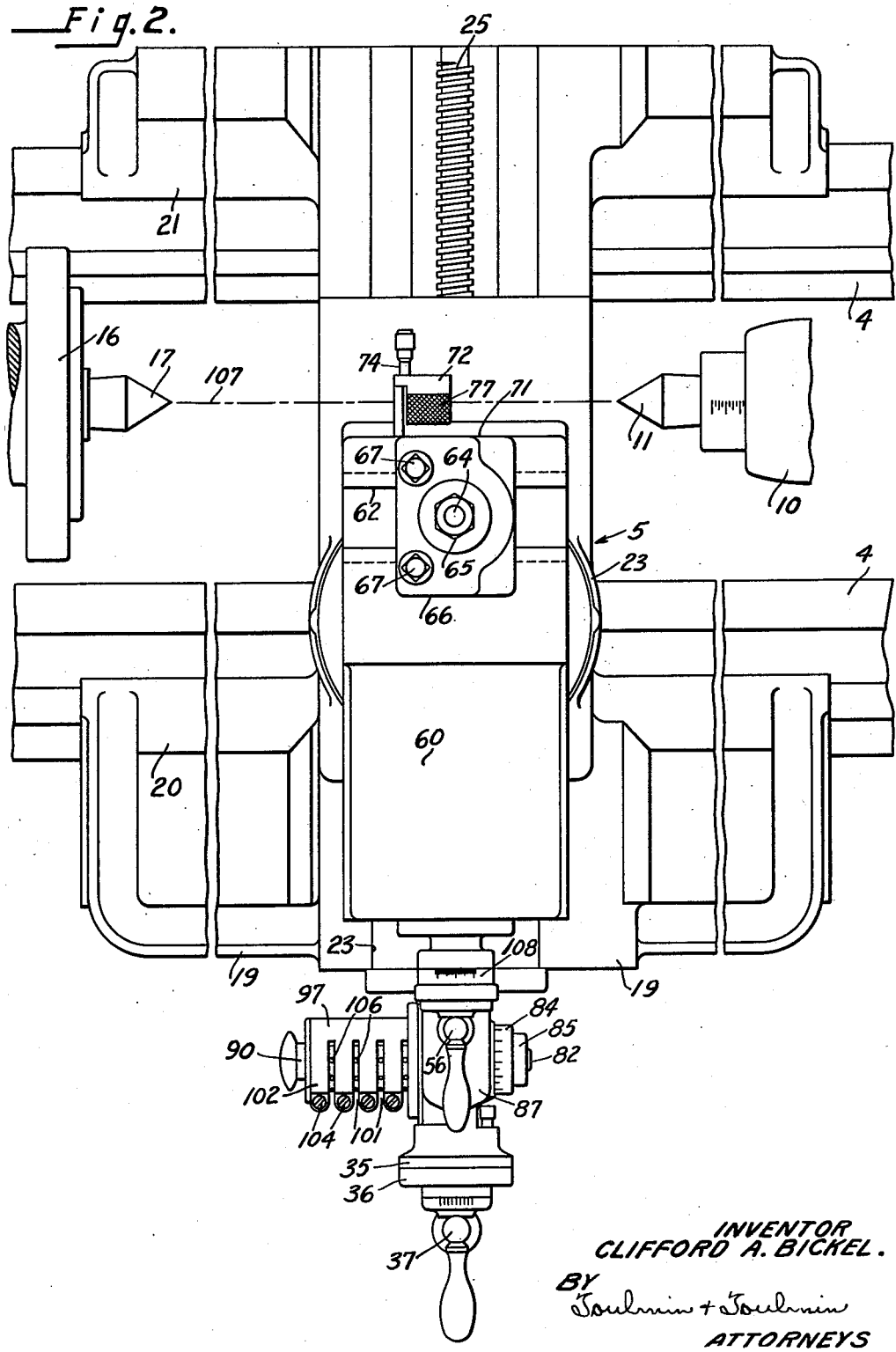

INVENTOR
CLIFFORD A. BICKEL.
BY Toulmin & Toulmin
ATTORNEYS

Patented Jan. 18, 1938

2,105,962

UNITED STATES PATENT OFFICE 2,105,962

DIAMETER GAUGING APPARATUS

Clifford A. Bickel, Sidney, Ohio, assignor to The Monarch Machine Tool Company, Sidney, Ohio, a corporation of Ohio Application May 28, 1935, Serial No. 23,887

11 Claims. (Cl. 82—24)

This invention relates to turning apparatus for turning articles, and in particular, to apparatus for turning articles to a predetermined diameter without the necessity for frequently stopping the machine to measure the diameter obtained.

One object of this invention is to provide apparatus for use in turning machinery, such as lathes, this apparatus having provision for setting the cutting tool in a predetermined and known position relative to the turning axis so that the tool may be fed to a position giving a known diameter, without the necessity of measuring the diameter at intermediate stages.

Another object is to provide a lathe carriage having devices for setting the cutting tool thereof at a predetermined and known distance from the axis of rotation of the lathe upon which the carriage is used, whereby the cross slide of the carriage may be moved transversely to a predetermined position by means of its micrometer dials, and thereby turn the work-piece to a known diameter without the necessity of measuring the diameter before taking the finishing cut.

Another object is to provide a carriage for a lathe, wherein the cross slide is provided with a micrometer adjustment for distance and the tool post has a reference face placed at a predetermined position relative to a reference mark, and a device for setting the cutting edge of the cutting tool on the axis of rotation of the lathe so that the cross slide may be moved forward or backward and returned to a definite position relative to the lathe axis, for producing work of a predetermined diameter without the necessity of intermediate calipering operations.

Another object is to provide a lathe carriage having an adjustable device with movable stops operatively connected to the feeding mechanism so that work-pieces may be turned to successive stepped diameters without the necessity of intermediate calipering operations to determine the diameters reached during the turning operations.

Another object is to provide a lathe carriage having adjustable devices for turning stepped work to predetermined diameters, these adjustable devices including a shaft operatively connected to the cross slide screw shaft and having a dog adapted to engage adjustable dogs arranged adjacent the shaft, these dogs being adjusted to be engaged by the shaft dog when the cutting tool has reached the limit of its feeding motion for producing the desired diameter of work.

Referring to the drawings:

Figure 2 is a plan view of the lathe carriage shown in Figure 1.

Figure 3 is a front elevation of the lathe carriage shown in Figures 1 and 2.

Figure 4 is an enlarged detail side elevation of the micrometer tool setting jig shown in Figure 1.

Figure 5 is an enlarged plan view, partly in section, of the automatic gauging apparatus for stepped work shown in Figure 2.

Figure 6 is a section along the line 6—6 of Figure 5.

Hitherto when it has been desired to turn a work-piece to a certain diameter, the operator was required to guess at the setting of the tool for turning the first diameter. After turning this diameter, he then measured the turned diameter in order to determine the actual diameter that he had turned. He then set the tool to make another cut, repeating the measurement after this cut and subsequent cuts until the desired diameter was reached. Thus, the operator is obliged to resort to a "cut and try" method in order to accurately turn a portion of a certain diameter upon the work-piece. If the operator makes the wrong estimate of the tool setting, the work may turn to a smaller diameter than is desired, with consequent spoilage. A considerable amount of time has also hitherto been required for stopping the machine and making the various measurements between the initial cut and the finishing cut of the machine.

The present invention provides means for quickly setting the tool for turning one or a number of diameters on a work-piece accurately and quickly, without resorting to this "cut and try" procedure. The invention also provides devices forming automatic diameter stops, which may be set by the operator for certain diameters when a number of different work-pieces are to be machined to the same dimensions, such as stepped pulleys.

By the device of the present invention the operator may set his machine and make a single cut, or a series of cuts, without the need for intermediate calipering or measurement so that he is able to proceed immediately to the finishing cut without any waste of time or material.

Figures 7, 8:
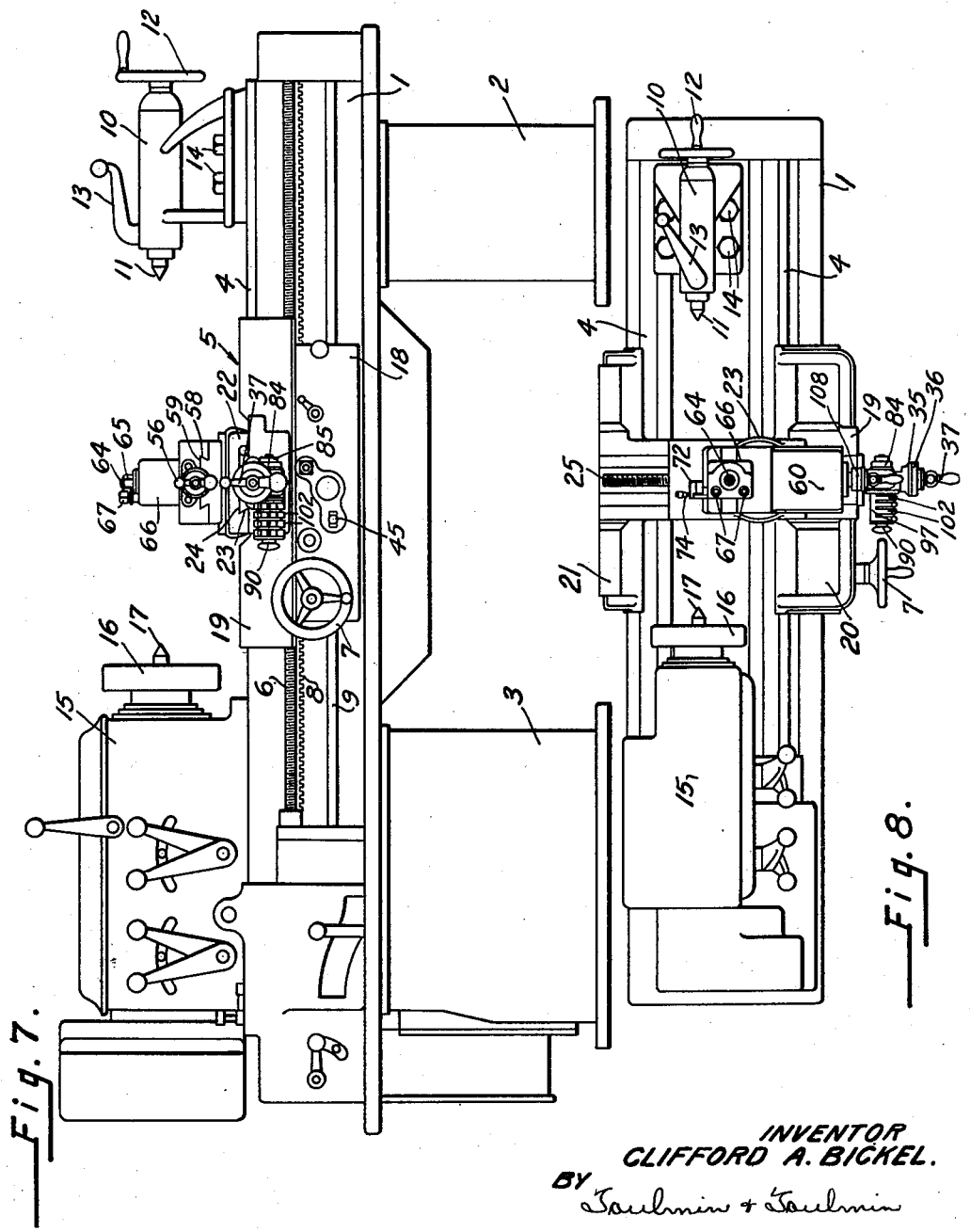
Figure 7 is a diagrammatic front elevation of a lathe equipped with the carriage and automatic gauging apparatus of my invention.
Figure 8 is a plan view of the lathe shown in Figure 7.

Referring to the drawings in detail, Figure 7 shows a lathe having a bed 1, mounted upon pedestals 2 and 3 and having longitudinal ways 4 on the upper portion thereof. The ways 4 are arranged to slidably receive the lathe carriage, generally designated 5, which is moved to and fro longitudinally by means of the lead screw 6, or manually by means of mechanism interconnecting the hand wheel 7 with the rack 8. The feed rod 9 transmits power from the lathe driving motor to the carriage 5, where it is transmitted by appropriate gearing to the transverse feeding mechanism.

The lathe shown in Figures 7 and 8 is provided with the usual tail-stock 10 having a dead center 11, adjusted longitudinally by the hand wheel 12 and locked in position by the lever 13. The tail-stock 10 is also adjustable as a whole by loosening the bolts 14, whereupon the tail-stock may be moved forward or backward and clamped in any desired position by again tightening the bolts 14 with a suitable wrench. The lathe is also provided with the usual head-stock 15, having a live spindle 16 projecting therefrom and containing the live center 17. The head-stock 15 contains suitable gearing for obtaining the various relative speeds desired between the live center 17 and the feed rod 9 or lead screw 6.

The details of the head-stock 15 and the tail-stock 10, or the apparatus directly associated therewith, form no part of the present invention and are of conventional construction. The lathe itself may be operated from an external source of power, but is preferably operated by an electric motor contained in one of the pedestals, such as the pedestal 3.

The lathe carriage 5 has an apron 18 attached to the carriage bed 19. The latter is divided into front and rear portions 20 and 21 (Figure 8), each of which engages one of the pair of ways 4 on the lathe bed. Mounted on the carriage bed 19 is the compound rest bottom slide 22. The latter is slidably mounted upon the interengaging ways 23 and groove 24, these being of corresponding tongue-and-groove cross section. The bottom slide 22 (Figure 1) is moved to and fro along its ways by means of the cross feed screw 25 engaging the adjustable nut, generally designated 26, secured to the bottom slide 22 by means of the machine screws 27. The adjustable portion 28 of the nut 26 is held in position by means of the bolt 29 and nut 30.

The cross feed screw 25 is, in effect, a continuation of the cross feed shaft 31 (Figure 1) and is rotatably mounted, by means of anti-friction bearings 32, in the housing 33 secured in the bore 34 of the carriage bed 19. The housing 33 is provided at its forward end with an index dial 35, adjacent to which is the cross feed micrometer dial 36 keyed to the cross feed shaft 31. On the outer end of the cross feed shaft 31 and keyed thereto is the hand crank 37, held in place by the nut 38.

Figure 1:
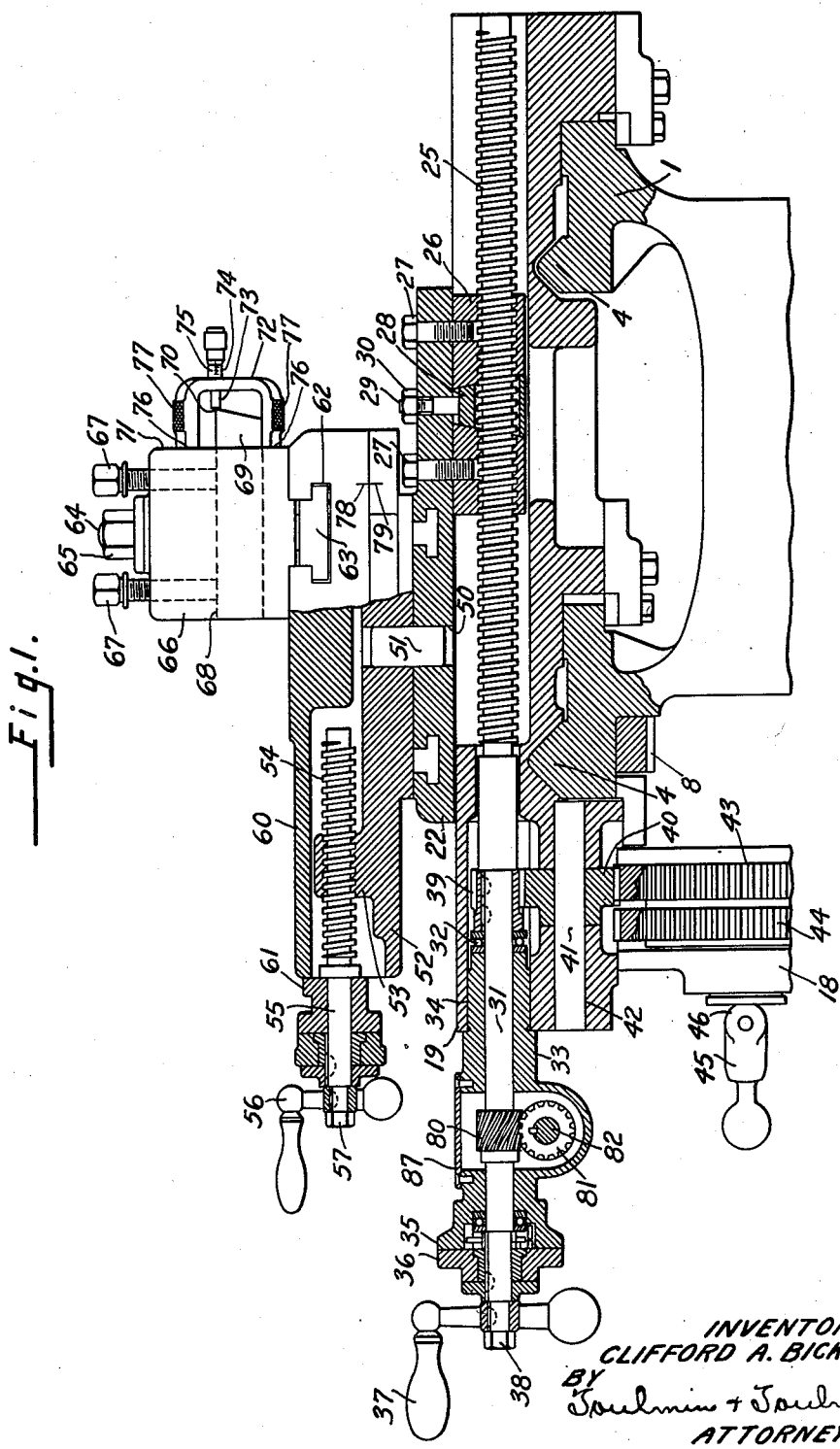
Figure 1 is a side view, partly in section, of the lathe carriage of my invention, the section being taken through the axis of the cross slide shaft.

Keyed to the cross feed shaft 31 is the cross feed pinion gear 39, which meshes with the cross feed intermediate gear 40, the latter being rotatably mounted upon the shaft 41 secured in the bore 42 of the carriage bed 19 (Figure 1). The cross feed intermediate gear 40 in turn meshes with the apron cross feed friction-driven gear 43, the latter being placed in or out of operative connection with the apron cross feed friction-drive gear 44 by means of the hand lever 45. The hand lever has a cam portion 46 serving to force the clutch portions of the gears 43 and 44 into engagement to transmit the power from the former to the latter. The gear 44 receives power from the feed rod 9 by appropriate gearing.

The compound rest bottom slide 22 is provided with a vertical bore 50 having a vertical shaft 51 therein. The latter serves as a swivel shaft to support the compound rest swivel 52, whereby the latter may be rotated upon the former. The compound rest swivel 52 is provided with a nut portion 53 engaged by the tool slide screw 54 (Figure 1), mounted upon the shaft 55 having the hand crank 56 secured thereto as by the nut 57. The compound rest swivel 52 is likewise provided with ways 58 engaging a corresponding groove 59 in the tool slide 60. The tool slide screw shaft 55 is rotatably supported in a housing 61 secured to or forming a part of the tool slide 60. Consequently, by turning the hand crank 56 the tool slide 60 may be caused to move to and fro by the engagement of the screw 54 with the nut portion 53.

The tool slide 60 is provided with a slot 62 engaged by the head 63 of the tool post bolt 64 having the nut 65 clamping the tool post 66 in any desired position along the slot 62. The tool post 66 also has the tool clamping screws 67 passing downwardly into the bore 68, where they engage the top of the cutting tool 69. In place of the cutting tool 69 the usual tool holder known to the trade as the "Armstrong" holder may be employed. For the purpose of simplicity, however, the member 69 is shown as a single cutting tool having a cutting tip 70.

The forward face 71 of the tool post 66 is ground to an accurate surface and will be hereafter termed the reference surface 71 of the tool post. Arranged to engage this surface 71 is the micrometer tool setting gauge 72, with its micrometer screw 73 passing through the barrel 74 of the gauge. The forward end of the micrometer screw 73 is arranged to be set at any desired position, as shown by the micrometer scale 75 upon the barrel 74. It will be understood that the ends 76 of the micrometer tool setting gauge 72 are likewise precisely ground so that they may be accurately placed against the tool post reference surface 71. Knurled portions 77 enable the tool setting gauge 72 to be easily and tightly grasped by the operator. The use of the micrometer tool setting gauge 72 will be described later.

The tool slide 60 and the compound rest swivel are each provided with index marks 78 and 79 (Figure 1). These index marks are located and used in connection with the use of the micrometer tool setting gauge 72, in a manner subsequently to be described.

Keyed to the cross feed screw shaft 31 near its forward end is the worm 80, which meshes with the worm gear 81 keyed to the worm gear shaft 82 (Figure 1). The worm gear shaft 82 is rotatably mounted, as at 83 (Figure 5), in the housing 33. Mounted on one end of this shaft 82 is the tool positioning dial 84, this being held in position against the housing 33 by means of a nut 85 (Figure 5). The housing 33 is provided with an index mark 86 serving to indicate the reading of the tool positioning dial 84. A cover plate 87 permits access to the worm 80 and the worm gear 81.

The shaft 82 is provided with a keyway 88, which serves to receive the key 89, (Figure 6) which unites it slidably to the hand stop selector 90. The latter is in the form of a sleeve longitudinally slidable with respect to the shaft 82. The hand stop selector 90 is provided with a projection or dog 91 having a radial bore 92 therein. The bore 92 serves to receive a ball detent 93 urged inward by a spring 94 having bearing engagement against the threaded cap 95, inserted in the threaded outer end of the bore 92. The shaft 82 is provided at intervals with annular grooves 96 (Figure 5), which serve to receive the ball detent 93 as the sleeve-like hand stop selector 90 is moved in or out.

The housing 33 is provided with a cylindrical projecting portion 97 having a bore 98 therethrough coaxial with the shaft 82. Mounted in this bore 98 are adjustable stop collars 99 having inward projections or dogs 100 (Figures 5 and 6). The outer surfaces of the stop collars 99 have close engagement with the bore 98. This engagement for each stop collar 99 may be tightened by means of the arrangement shown in Figures 2 and 6.

According to this arrangement the forward part of the housing portion 97 is provided with a plurality of transverse slots 101 serving to separate the forward portions into a plurality of clamping portions 102. Each of these clamping portions is slotted longitudinally, as at 103 (Figures 3 and 6), and a screw 104 having a threaded engagement in a hole 105 serves to loosen or tighten the two halves of the clamping portions. The stop collars 99 are provided with peripheral recesses 106 placed at intervals around the circumference of the collar, and serving to receive any suitable implement for the purpose of rotating the stop collar 99 within its bore 98.

In the positioning of the index marks 78 and 79 on the tool slide and cross feed swivel 60 and 52, respectively, (Figure 1) the cross feed micrometer dial 36 and the tool positioning dial 84 are set at zero. The tool post 66 is positioned with its reference surface 71 at a certain predetermined distance from the center line 107 of the lathe (Figures 2 and 3). This center line is the axis upon which the work-piece rotates between the live center 17 and the dead center 11.

Assuming that this predetermined distance is one inch, for example, after setting the tool post reference surface 71 at one inch separation from the center line of the lathe by appropriate measuring instruments, the index marks 78 and 79 are scribed. The micrometer tool setting gauge 72 may then be placed with its ground ends 76 against the reference surface 71, and with its micrometer screw 73 spaced exactly one inch from the ends 76. If now the tip 70 of the tool 69 be brought into contact with the end of the micrometer screw 73, with the index marks 78 and 79 in coincidence, and the micrometer dials 36 and 84 set at zero, the tool tip 70 will be exactly coincident with the center line of the lathe. At this point it may be clamped in position by tightening the screws 67.

In the operation of the invention to set the cross slide and tool to cut a predetermined diameter on a work-piece, the operator merely turns the cross feed hand crank 37 backward, while watching the cross feed micrometer dial 36 until the latter indicates that the cross slide 22 has been moved back the required distance. It will be understood that the cross feed micrometer dial 36 is calibrated directly in terms of a convenient unit of measurement, such as in thousandths of an inch which a given graduation will move the cross slide.

When the micrometer dial is rotated to the necessary position, the cutting tool tip 70 will then be positioned the desired distance from the center line 107 of the lathe so that a diameter of the desired amount will be turned upon the workpiece. After this diameter has been turned the tip 70 of the cutting tool 69 may be placed at a second position by following the same procedure, and another cut taken to produce a portion of a different diameter.

Thus, by providing a known starting point in the manner of this invention, all successive diameters on a work-piece can be readily selected merely by rotating the micrometer cross feed dial 36 and the tool positioning dial 84. The graduations of the latter, it will be understood, will represent a much greater movement of the cutting tool because of the reduction brought about between the worm 80 and the worm gear 81 interconnecting their shafts 31 and 82, respectively, (Figure 1). Thus, for example, each cross feed dial graduation might represent a motion of 0.001 of an inch on the diameter of a work-piece, whereas each graduation of the tool positioning dial 84 might represent one-half an inch on the diameter of the work-piece. The compound rest or tool rest dial 108 (Figure 1) is similarly graduated, each graduation representing, for example, 0.002 of an inch on the diameter of the workpiece.

If the work being machined is repetitive the selective stop system shown in Figures 5 and 6 may be used to accomplish a predetermined diameter upon the work-piece without the necessity of making intermediate measurements. In the use of this apparatus the operator sets the cross feed micrometer dial 36 and the tool positioning dial 84 for the first diameter being turned, in the manner previously described. Then with the hand stop selector 90 pushed inward as far as it will go, as to the right, (Figure 5) the ball detent 93 will engage the right-hand annular groove 96, bringing the rotating dog 91 into line with the adjustable dog 100.

The screw 104 is then loosened and the first stop collar 99 turned by inserting the proper tool in one of the recesses 106, access to this being obtained by means of the slots 101 until the dog 100 comes into contact with the rotatable dog 91. The stop collar is then clamped in position by tightening the first screw 104, whereupon the hand stop selector 90 is pulled outward until the ball detent engages the second annular groove 96. The cross feed screw shaft 31 is then turned by means of the hand crank 37 until the micrometer dials 36 and 84 give the proper reading for the second stepped portion on the work-piece. The second stop collar 99 is then adjusted until its dog 100 is in engagement with the rotatable dog 91 in the same manner as the first stop collar, and clamped in position by means of the second clamp screw 104. This procedure is followed out until each of the stop collars 99 is set at its appropriate position to turn a stepped portion of the desired diameter upon the work-piece.

While four different stop collars 99 have been shown, giving four different diameters to which the work-piece may be turned in stepped sequence, it will be understood that a greater or a lesser number may be provided, according to the nature of the work and the scope of the machine.

As each successive diameter has been machined, the rotating dog 91 comes into engagement with the fixed dog 100 when the cross feed screw 25 has been fed inward as far as possible by turning the hand crank 37. When this stopping point is reached the operator knows that the tip of the cutting tool has been placed at the proper position for cutting the desired diameter upon the work-piece. The operator then pulls the hand stop selector 90 outward until he feels the ball detent 93 enter the second annular groove 96, whereupon he turns the cross feed screw 25 by means of the hand crank 37 until the second fixed collar dog 100 comes into engagement with the second position of the rotating dog 91. The machine will now cut the second position of appropriate diameter upon the work-piece. The same procedure will result in the succeeding diameters being properly turned upon the work-piece. In this manner no preliminary or intermediate reading or measuring is required because the tool can be immediately set for all succeeding diameters by the use of the collar stops 99, as previously described.

It will be understood that I desire to comprehend within this invention such modifications as come within the scope of the claims and the invention.

Having thus fully described my invention, what I claim as new and desire to secure by Letters Patent, is:

1. In a machine for turning work-pieces, means for supporting and rotating a work-piece about a rotational axis, a carriage, a cross slide on said carriage, a tool holder on said cross slide having a reference portion, a cutting tool on said tool holder, a tool-setting gauge for engaging said reference portion and having a tool-contacting portion spaced toward said axis a selected distance from said reference portion, means for clamping said cutting tool with its cutting edge engaging said tool-contacting portion, means associated with said carriage and said cross slide for indicating the relative positioning thereof with said tool-contacting portion and said cutting tool edge coinciding with said rotational axis, a cross slide mechanism for moving said cutting tool from its position of coincidence with said rotational axis outwardly to a predetermined radius, and measuring means associated therewith for directly indicating the reaching of said predetermined radius by said tool and cross slide.

2. In a lathe, means for rotating a work-piece about an axis, a carriage, a slide movable relatively to said carriage, a tool support on said slide, a cutting tool on said tool support, a screw shaft on said carriage operatively connected to move said slide toward and away from said axis, an index mark arranged on said slide, a cooperating index mark arranged on said carriage, a locating portion of said tool support being arranged a predetermined distance from said axis when said index marks are in coincidence, means for placing the cutting edge of said cutting tool the same predetermined distance from the locating portion of said tool support so as to place said cutting edge in coincidence with said axis when said index marks are in coincidence, and means operatively connected to said screw shaft for moving said slide and said tool support a selected distance away from one index mark, whereby to position said cutting tool edge at a predetermined radius from said axis so as to cut a predetermined diameter on said work-piece.

3. In a machine for turning work-pieces, means for supporting and rotating a work-piece about a rotational axis, a carriage, a cross slide on said carriage, a tool holder on said cross slide having a reference portion, a cutting tool on said tool holder, a tool-setting gauge for engaging said reference portion and having a tool-contacting portion spaced toward said axis a selected distance from said reference portion, means for clamping said cutting tool with its cutting edge engaging said tool-contacting portion, a pair of index elements associated with said carriage and said cross slide and adapted when in alignment to position said cross slide with said tool-contacting portion and said cutting tool edge in coincidence with said rotational axis, a cross slide mechanism for moving said cutting tool from its position of coincidence with said rotational axis outwardly to a predetermined radius, and measuring means associated therewith for directly indicating the reaching of said predetermined radius by said tool and cross slide.

4. In a machine for turning work-pieces, means for supporting and rotating a work-piece about a rotational axis, a carriage, a cross slide on said carriage, a tool holder on said cross slide having a reference portion, a cutting tool on said tool holder, a tool-setting gauge for engaging said reference portion and having a tool-contacting portion spaced toward said axis a selected distance from said reference portion, means for clamping said cutting tool with its cutting edge engaging said tool-contacting portion, means associated with said carriage and said cross slide for indicating the relative positioning thereof with said tool-contacting portion and said cutting tool edge coinciding with said rotational axis, a cross slide screw for moving said cutting tool from its position of coincidence with said rotational axis outwardly to a predetermined radius, and a micrometer measuring device connected thereto for directly indicating the reaching of said predetermined radius by said cutting tool.

5. In a machine for turning work-pieces, means for supporting and rotating a work-piece about a rotational axis, a carriage, a cross slide on said carriage, a tool holder on said cross slide having a reference portion, a cutting tool on said tool holder, a tool-setting gauge for engaging said reference portion and having a tool-contacting portion spaced toward said axis a selected distance from said reference portion, means for clamping said cutting tool with its cutting edge engaging said tool-contacting portion, means associated with said carriage and said cross slide for indicating the relative positioning thereof with said tool-contacting portion and said cutting tool edge coinciding with said rotational axis, a cross slide mechanism for moving said cutting tool from its position of coincidence with said rotational axis outwardly to a predetermined radius, measuring means associated therewith for directly indicating the reaching of said predetermined radius by said tool and cross slide, and a micrometer screw on said tool-setting gauge for adjustably regulating the separation of said tool-contacting portion from the reference portion of said tool holder.

6. In combination, means for rotating a work-piece about an axis, a cutting tool, a carrier for said cutting tool, means for moving said carrier and said tool toward and away from said axis, means for indicating the amount of said motion quantitatively, a shaft operatively connected to said carrier moving means to be moved thereby, a stop secured to said shaft, a plurality of fixed stops arranged to be selectively engaged by said shaft stop, and means for shifting said shaft stop longitudinally along said shaft to sequentially engage said fixed stops, whereby to position the cutting tool at a plurality of predetermined distances from said axis.

7. In combination, means for rotating a workpiece about an axis, a cutting tool, a carrier for said cutting tool, means for moving said carrier and said tool toward and away from said axis, means for indicating the amount of said motion quantitatively, a shaft operatively connected to said carrier moving means to be moved thereby, a stop secured to said shaft, devices to indicate the amount of motion of said shaft, a plurality of fixed stops arranged to be selectively engaged by said shaft stop, means for adjustably positioning said fixed stops relatively to said shaft stop, means for shifting said shaft stop longitudinally along said shaft to sequentially engage said fixed stops, means for setting the cutting edge of the cutting tool coincident with said axis of rotation, and means on said carrier arranged to indicate when said cutting tool edge is so set in coincidence with said axis.

8. In combination, means for rotating a workpiece about an axis, a cutting tool, a carrier for said cutting tool, means for moving said carrier and said tool toward and away from said axis, means for indicating the amount of said motion quantitatively, a shaft operatively connected to said carrier moving means to be moved thereby, a sleeve drivingly mounted on said shaft, said sleeve being movable longitudinally along said shaft, means for driving said sleeve from said shaft while longitudinally moving said sleeve, a stop secured to said sleeve, and a plurality of stationary stops arranged to be selectively engaged by said sleeve stop in response to the rotation of said sleeve by said shaft, whereby to position the cutting tool at a plurality of predetermined distances from said axis.

9. In combination, means for rotating a workpiece about an axis, a cutting tool, a carrier for said cutting tool, means for moving said carrier and said tool toward and away from said axis, means for indicating the amount of said motion quantitatively, a shaft operatively connected to said carrier moving means to be moved thereby, a sleeve drivingly mounted on said shaft, said sleeve being movable longitudinally along said shaft, means for driving said sleeve from said shaft while longitudinally moving said sleeve, a stop secured to said sleeve, a plurality of stationary stops arranged to be selectively engaged by said sleeve stop in response to the rotation of said sleeve by said shaft, whereby to position the cutting tool at a plurality of predetermined distances from said axis, and means for adjustably positioning said fixed stops relatively to said sleeve stop.

10. In an automatic gauging mechanism for turning machines, a shaft operatively connected to the feeding mechanism of the lathe tool, a sleeve drivingly mounted on said shaft and movable longitudinally therealong, means for driving said sleeve from said shaft while longitudinally moving said sleeve, a stop secured to said sleeve, and a plurality of fixed stops arranged to be selectively engaged by said sleeve stop.

11. In an automatic gauging mechanism for turning machines, a shaft operatively connected to the feeding mechanism of the lathe tool, a sleeve drivingly mounted on said shaft and movable longitudinally therealong, means for driving said sleeve from said shaft while longitudinally moving said sleeve, a stop secured to said sleeve, a plurality of fixed stops arranged to be selectively engaged by said sleeve stop, and means for adjustably positioning said fixed stops relatively to said sleeve stop.

CLIFFORD A. BICKEL.